(12) United States Patent
Nania et al.

(10) Patent No.: US 10,927,581 B2
(45) Date of Patent: Feb. 23, 2021

(54) TAILGATE STEP STOWAGE ASSISTANCE

(71) Applicant: FORD GLOBAL TECHNOLOGIES, LLC, Dearborn, MI (US)

(72) Inventors: Adrian Nania, Rochester, MI (US); Craig A. Moccio, Milan, MI (US); Brian K. Sullivan, Plymouth, MI (US); Manuel Santana, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 349 days.

(21) Appl. No.: 16/150,545

(22) Filed: Oct. 3, 2018

(65) Prior Publication Data
US 2020/0109588 A1 Apr. 9, 2020

(51) Int. Cl.
*E05F 15/40* (2015.01)
*E05F 15/614* (2015.01)
*B60R 3/02* (2006.01)
*B62D 33/03* (2006.01)
*G07C 5/00* (2006.01)
*B60N 3/02* (2006.01)
*B62D 33/027* (2006.01)

(52) U.S. Cl.
CPC ............... *E05F 15/40* (2015.01); *B60R 3/02* (2013.01); *B62D 33/03* (2013.01); *E05F 15/614* (2015.01); *G07C 5/008* (2013.01); *B60N 3/023* (2013.01); *B62D 33/0273* (2013.01); *E05Y 2201/434* (2013.01); *E05Y 2900/544* (2013.01); *G05B 2219/2641* (2013.01)

(58) Field of Classification Search
CPC .......... E05F 15/40; E05F 15/614; B60R 3/02; B62D 33/0273; E05Y 2201/434; E05Y 2900/544; G05B 2219/2641
See application file for complete search history.

(56) References Cited

U.S. PATENT DOCUMENTS

| | | | |
|---|---|---|---|
| 6,918,624 B2 | 7/2005 | Miller et al. | |
| 6,991,277 B1 | 1/2006 | Esler | |
| 7,287,798 B2 | 10/2007 | King | |
| 8,798,871 B2 | 8/2014 | Lugash et al. | |
| 8,919,853 B2 | 12/2014 | Krishnan et al. | |
| 9,517,711 B2 | 12/2016 | Krajenke et al. | |
| 9,797,180 B2 | 10/2017 | Salmon et al. | |
| 2013/0154230 A1* | 6/2013 | Ziaylek | B60R 3/02 280/166 |
| 2015/0123374 A1* | 5/2015 | Smith | B60R 3/002 280/166 |
| 2015/0329056 A1* | 11/2015 | Leitner | B60R 3/02 280/166 |
| 2015/0361710 A1* | 12/2015 | Hansen | E05F 15/614 296/51 |
| 2017/0282979 A1* | 10/2017 | Singer | B60R 19/32 |
| 2017/0298765 A1* | 10/2017 | Ertas | F16C 32/0603 |
| 2018/0272976 A1* | 9/2018 | Root | B60R 11/04 |

OTHER PUBLICATIONS https://www.fordf150.net/2008/tailgate-step.php.
https://www.trucktrend.com/news/1803-coolest-feature-2019-gmc-sierra-tailgate/.

* cited by examiner

Primary Examiner — Richard M Camby
(74) Attorney, Agent, or Firm — David Coppiellie; MacMillan, Sobanski & Todd, LLC

(57) ABSTRACT

A vehicle tailgate with a power up-down system may employ a method of operating a vehicle tailgate that may include detecting a step is deployed from the tailgate, detecting the tailgate is less than fully open, and automatically actuating a power up-down system to drive the tailgate to fully open.

15 Claims, 5 Drawing Sheets

US 10,927,581 B2

TAILGATE STEP STOWAGE ASSISTANCE

BACKGROUND OF THE INVENTION

The present invention relates to a vehicle having a downward pivoting closure and more specifically to a tailgate assembly providing assistance for inserting a stowable item within the tailgate.

Some vehicle closures, such as a tailgate, are provided with assemblies that are conveniently stowable within the closure. For example, a tailgate may include a step assembly that can be pulled telescopically from the open tailgate and then pivoted downward to ease access to a truck bed. However, while one is manually lifting the step assembly to align it for telescopically sliding the assembly into the tailgate, this lifting action may inadvertently cause the tailgate to begin pivoting upward, making sliding of the assembly into the tailgate more difficult.

SUMMARY OF THE INVENTION

An embodiment contemplates a method of operating a vehicle tailgate, including detecting a step is deployed from the tailgate, detecting the tailgate is less than fully open, and automatically actuating a power up-down system to drive the tailgate to fully open.

An embodiment contemplates a vehicle that includes a closure, pivotally mounted to the vehicle, including a step deployable from within the closure; a power system, configured to open and close the closure, including a position sensor; and a deployment switch detecting when the step is stowed. The vehicle may also include a controller detecting that the step is deployed from the closure, detecting the closure is less than fully open, and automatically actuating the power system to drive the closure to fully open.

An advantage of an embodiment is that a power up-down system for a closure, such as a tailgate, may be employed to hold the closure in a fully open position while a step assembly is being moved from a deployed to stowed position. Such an assistance with stowage of a step assembly may be completed without interfering with the operation of the power up-down system for the closure.

DETAILED DESCRIPTION

Figure 1:
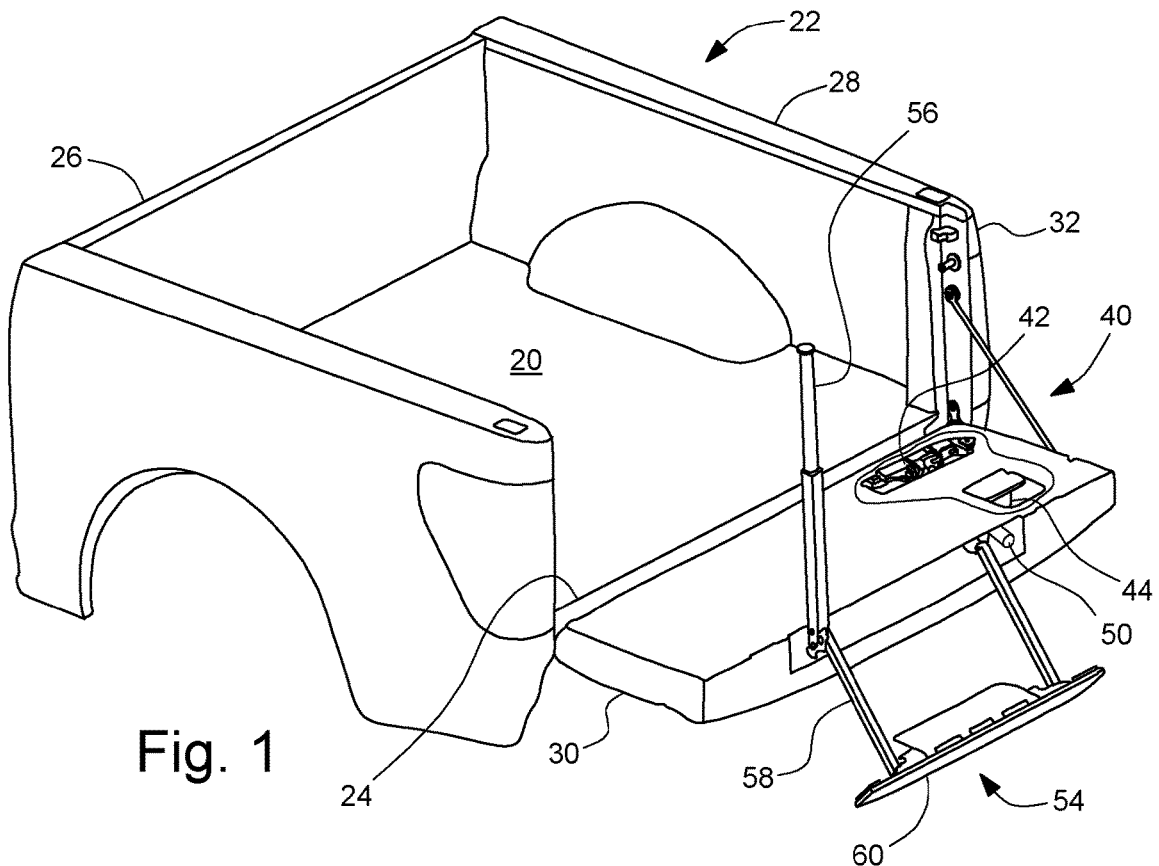
FIG. 1 is a schematic, partial cutaway, perspective view of a rear portion of a pickup truck with an open tailgate, showing a step assembly in a fully deployed position.
Figure 2:
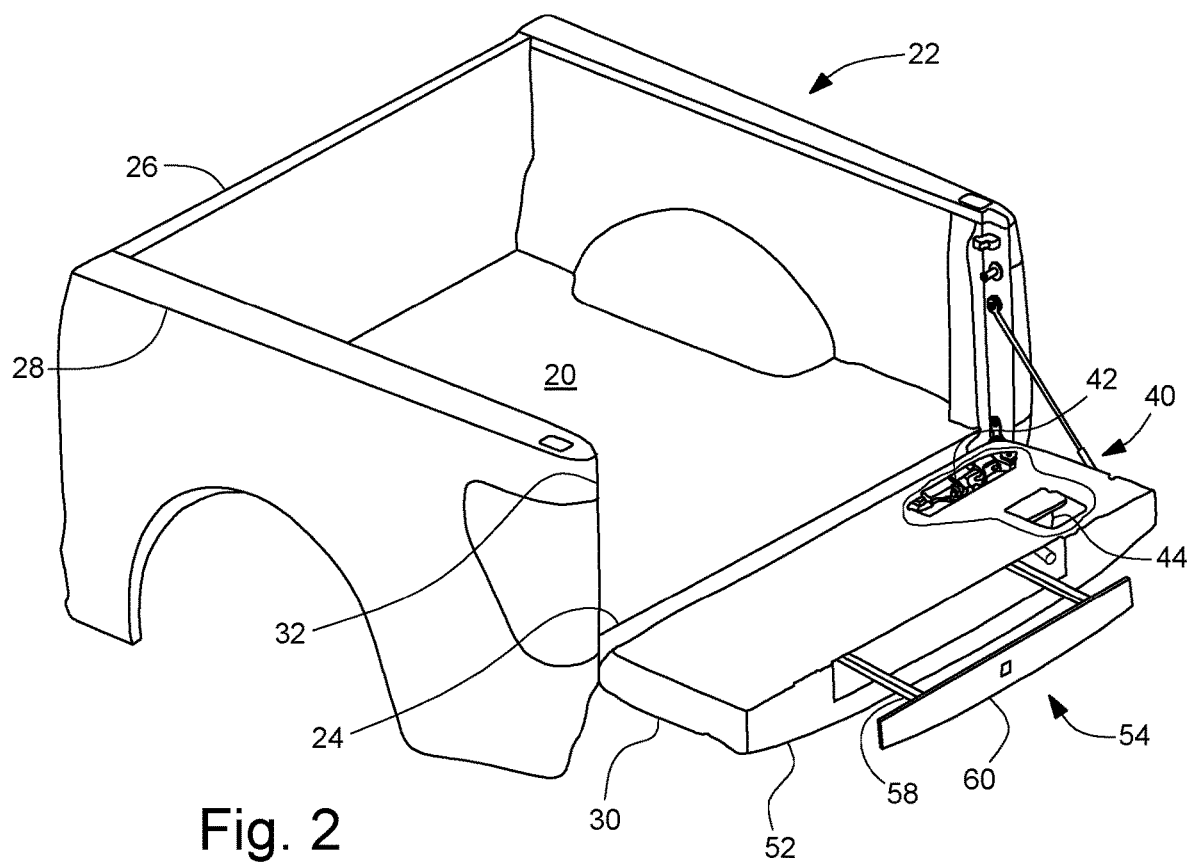
FIG. 2 is a schematic, partial cutaway, perspective view similar to FIG. 1, but with the step assembly shown in a partially stowed position.
Figure 3:
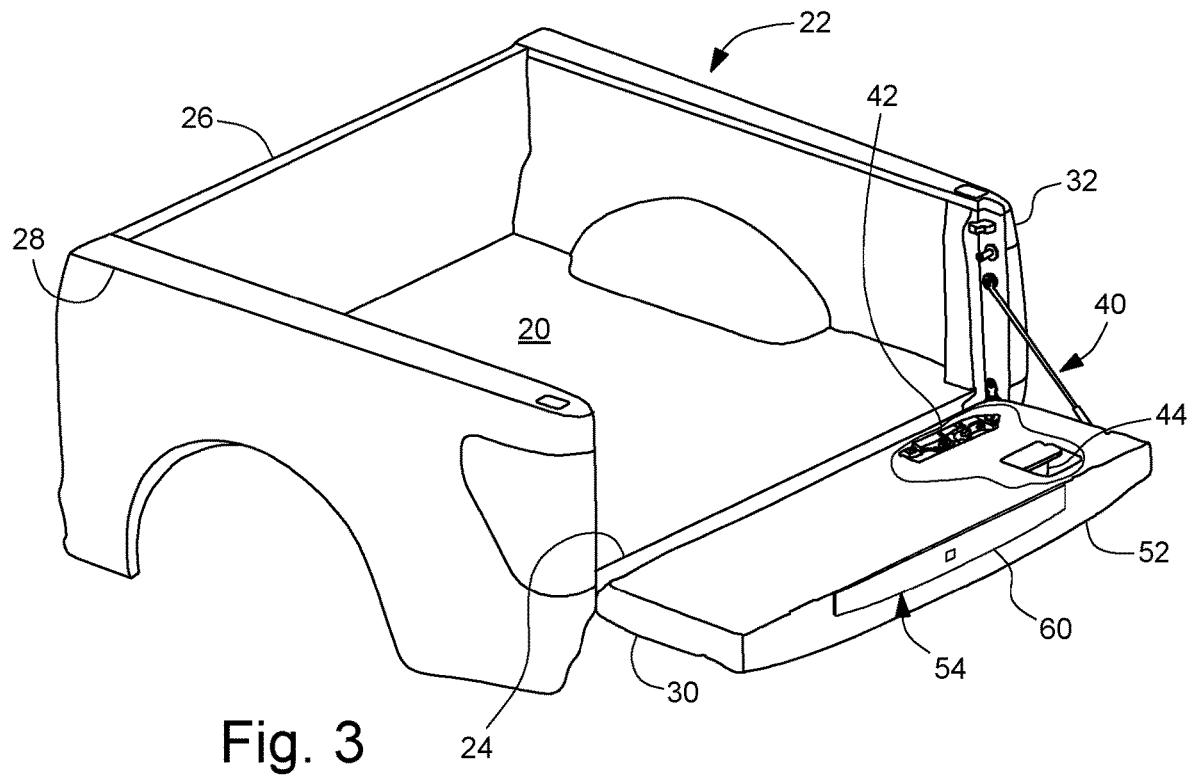
FIG. 3 is a schematic, partial cutaway, perspective view similar to FIG. 1, but with the step assembly shown in a stowed position.
Figure 4:
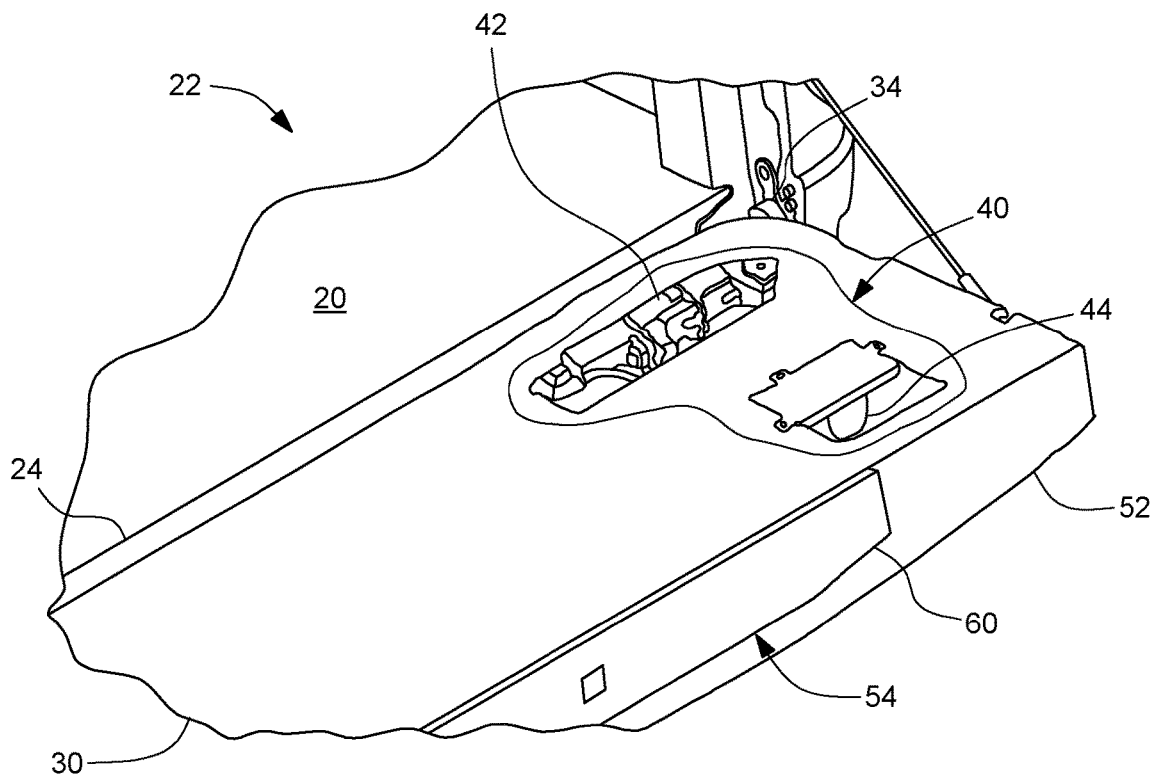
FIG. 4 is a schematic, partial cutaway, perspective view of a portion of FIG. 3, shown in an enlarged scale.
Figure 5:
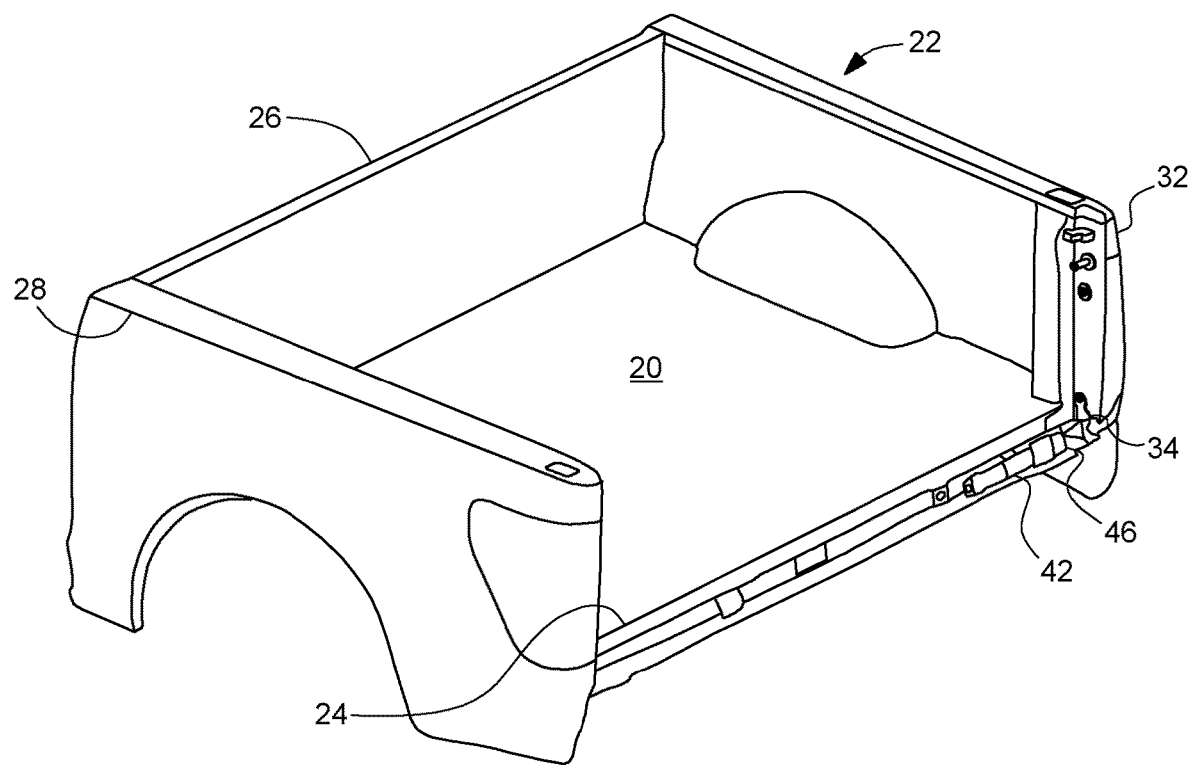
FIG. 5 is a schematic perspective view of a rear portion of a pickup truck, with the tailgate not shown.
Figure 7:
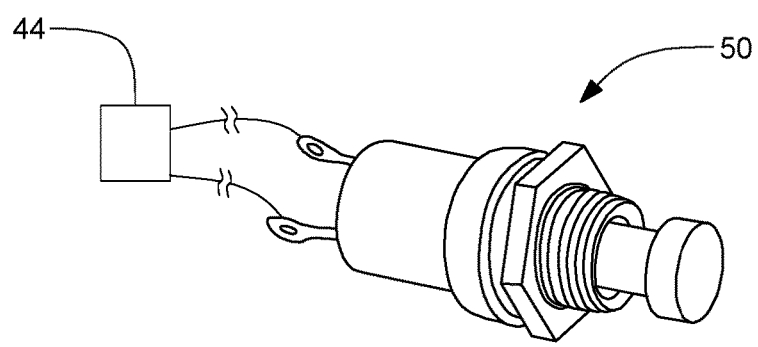
FIG. 7 is a perspective view of a switch employed with the vehicle of FIGS. 1-6.
Figure 6:
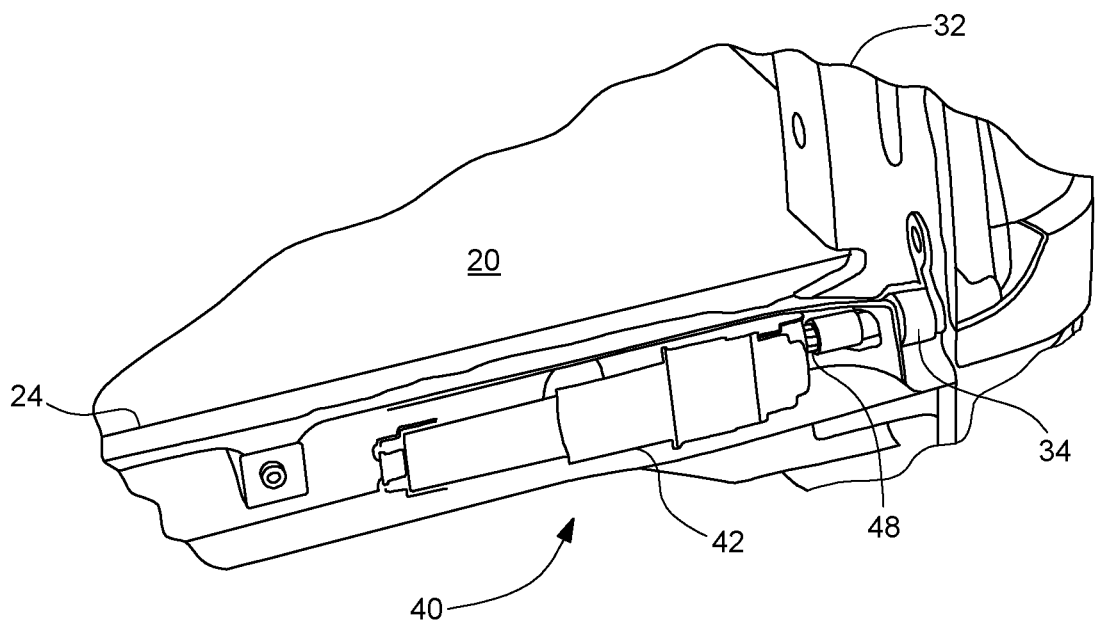
FIG. 6 is a schematic perspective view of a portion of FIG. 5, shown in an enlarged scale.

FIGS. 1-6 illustrate a bed 20 of a vehicle 22, such as a pickup truck, including a floor 24, surrounded by a front wall 26, a pair of sidewalls 28 and a closure, such as a tailgate 30. Each sidewall 28 includes a truck bed pillar 32 at its rear end, with tailgate pivot hinges 34 about which the tailgate 30 pivots.

The vehicle 22 is configured to provide remote power up-down of the tailgate 30. A power up-down system 40 may include a drive unit 42, which may include internal components such as a motor, electro-mechanical clutch and source of electric power for the motor. Motors, electro-mechanical clutches and sources of electric power for vehicles are known in the art and so will not be discussed or shown further herein. The drive unit 42 may selectively connect between the tailgate 30 and the bed pillar 32 to pivot the tailgate 30 back and forth between a closed (up) position and open (down) position about the pivot hinges 34. The power up-down system 40 may also include a controller 44 that receives signals and controls the up-down movement of the tailgate 30 via the drive unit 42. While the controller 44 is shown mounted in the tailgate 30, it may be mounted at other vehicle locations and may be part of another controller, such as for example a vehicle's body controller, if so desired.

Figure 8A:
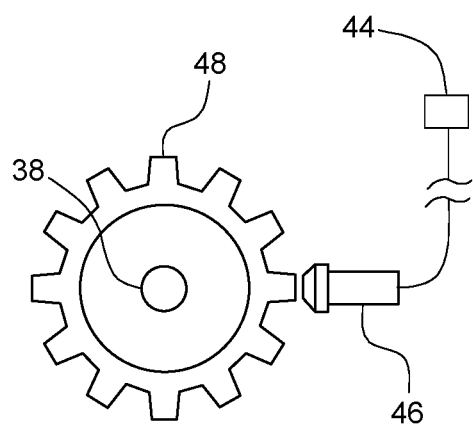
FIGS. 8a and 8b are schematic representations of a sensor, the sensor being employed with the vehicle of FIGS. 1-6.
Figure 8B:
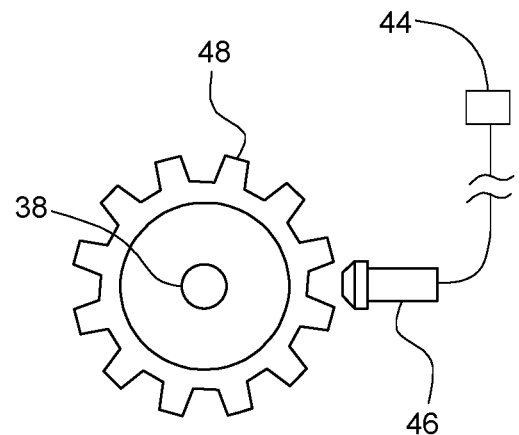

The power up-down system 40 may also include a tailgate position sensor 46. This position sensor 46 may be for example a Hall effect sensor (see FIGS. 8a-8b) that is mounted adjacent to the drive unit 42 and detects rotation of a toothed member 48 that rotates with a motor shaft 38 as the tailgate 30 is raised and lowered. As the teeth of the toothed member 48 rotate past the sensor 46, the rotation of the tailgate 30 is tracked. The output of this sensor 46 is employed by the controller 44 to track the position of the tailgate 30. Hall effect sensors are known in the art and so will not be discussed in more detail herein.

The power up-down system 40 may also include a step-deployed switch 50 that is mounted adjacent to a top surface 52 of the tailgate 30. This switch 50 is in communication with the controller 44. The switch 50 is closed when a step assembly 54 is in a fully stowed position (shown in FIGS. 3 and 4) and is open when the step assembly 54 is in a partially deployed (shown in FIG. 2) or fully deployed (shown in FIG. 1) position.

The step assembly 54 may include a hand assist support 56 that is retractable into the tailgate 30 when not needed. The step assembly 54 may also include a pair of support rails 58 connected to a laterally extending step 60. The details of a step assembly 54 that may be employed with the tailgate are disclosed in U.S. Pat. No. 6,918,624, which is incorporated herein, in its entirety, by reference. The support rails 58 extend from the top surface 52 of the tailgate 30 and can be telescopically received within the tailgate 30 when properly aligned for telescopic insertion (see FIG. 2). The support rails 58 may also be pivoted downward after being extended from the tailgate 30 (see FIG. 1) in order to more easily be used as a step by someone wishing to climb into the bed 20. When the step assembly 54 is in its fully stowed position (see FIGS. 3 and 4) it contacts the step-deployed switch 50, moving the switch 50 to the closed position, and when not in its fully stowed position (see FIGS. 1-2), the switch 50 is open thus indicating to the controller 44 that the step assembly 54 is at least partially deployed.

Figure 9:
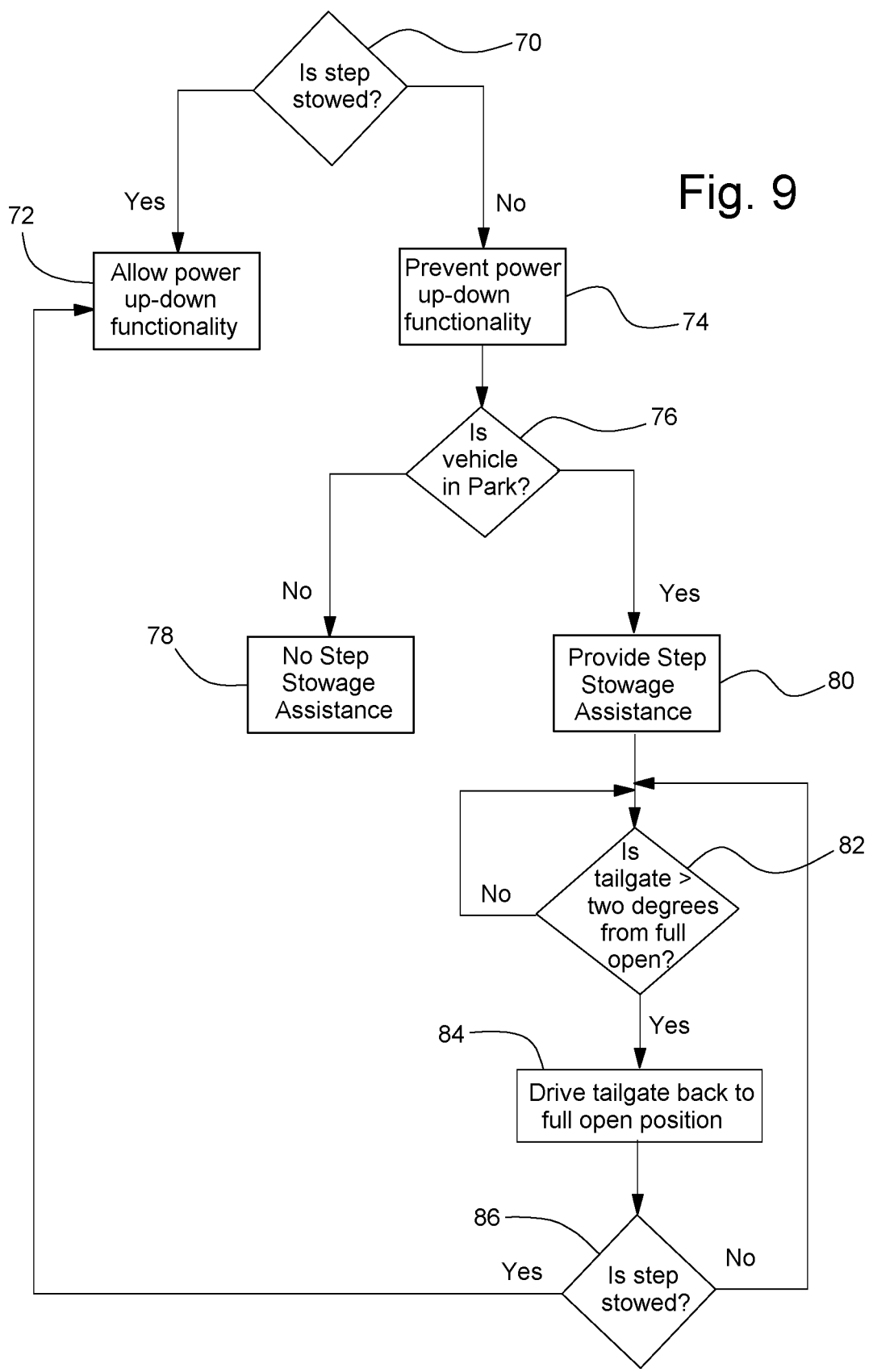
FIG. 9 is a flow chart illustrating an operation relating to the pickup truck of FIGS. 1-8.

The operation of the power up-down system 40 for the tailgate will now be discussed relative to FIG. 9, with reference to FIGS. 1-8. Under conditions where the step assembly 54 is stowed, step 70, the tailgate 30 may be opened and closed using either typical hand operation or using the power up-down system 40, step 72. The determination by the controller 44 as to whether the step 54 is stowed may be based on the step-deployed switch 50. When the step 54 is stowed, then the step 54 actuates the switch 50 by pressing on it.

If the step assembly 54 is not stowed, step 70, the functionality of the power up-down system 40 of the tailgate 30 is prevented, step 74. The controller 44 determination of not being stowed (deployed) is based on the step 54 not engaging the switch 50.

A determination is made as to whether the vehicle 22 is in Park, step 76. In this case, Park generally refers to the Park setting of a transmission, but other indicators that the vehicle 22 is prevented from moving may be employed instead, if so desired. If the vehicle 22 is not in Park, then the controller 44 does not provide step stowage assistance, step 78.

If in Park, then step stowage assistance may be provided, step 80. With step stowage assistance, a determination is made whether the tailgate 30 is greater than two degrees from a fully open tailgate 30, step 82. This determination of angle of opening may be based on the inputs to the controller 44 from the tailgate position sensor 46. While two degrees is used as an example herein, one may choose a larger or smaller angle of displacement from full open as the threshold for this method. If not greater than two degrees, then no action is taken by the power up-down system 40.

If the tailgate 30 is greater than two degrees from a fully open tailgate 30, step 82, then the power up-down system 40 is activated to drive the tailgate 30 back to the fully open position, step 84. This may be a repetitive drive towards open sequence so long as the step is not stowed and the tailgate is more than two degrees from fully open.

What is essentially being detected when the tailgate 30 lifts upward from the fully open position is someone manually lift upward on the step 60 to pivot the support rails 58 upward. In this situation, by driving the tailgate 30 downward with the power up-down system 40, the tailgate 30 stays in position, making alignment of the support rails 58 for telescopic insertion into the tailgate 30 easier.

Once the movement from deployed to stowed position of the step assembly 54 is complete, the step-deployed switch 50 is actuated, indicating a stowed step 54, step 86, which then allows for power up-down functionality of the tailgate 30 to resume, step 72.

While certain embodiments of the present invention have been described in detail, those familiar with the art to which this invention relates will recognize various alternative designs and embodiments for practicing the invention as defined by the following claims.

The invention claimed is:

1. A method of operating a tailgate of a vehicle comprising:
    (a) detecting a step is deployed from the tailgate;
    (b) detecting the tailgate is less than fully open; and
    (c) automatically actuating a power up-down system to drive the tailgate to fully open.

2. The method of claim 1 wherein step (c) is prevented unless the vehicle is in Park.

3. The method of claim 2 wherein step (b) is based on a threshold of approximately two degrees from fully open.

4. The method of claim 2 further including:
    (d) preventing the power up-down system from moving the tailgate from an open position to a closed position when detecting that the step is not stowed.

5. The method of claim 1 wherein step (b) is based on a threshold of approximately two degrees from fully open.

6. The method of claim 1 further including:
    (d) preventing the power up-down system from moving the tailgate from an open position to a closed position when detecting that the step is not stowed.

7. The method of claim 1 wherein step (a) includes a step-deploy switch being mounted adjacent to a top surface of the tailgate and the step-deploy switch not being actuated when the step is deployed from the tailgate.

8. The method of claim 1 wherein step (b) includes a Hall effect sensor detecting a position of the tailgate relative to the vehicle.

9. A vehicle comprising:
    a closure, pivotally mounted to the vehicle, including a step deployable from within the closure;
    a power system, configured to open and close the closure, including a position sensor;
    a deployment switch detecting when the step is stowed; and
    a controller detecting that the step is deployed from the closure, detecting the closure is less than fully open, and automatically actuating the power system to drive the closure to fully open.

10. The vehicle of claim 9 wherein the closure is a tailgate.

11. The vehicle of claim 9 wherein the deployment switch is mounted adjacent to a surface of the closure from which the step is deployed, and the step engages the deployment switch when stowed.

12. The vehicle of claim 9 wherein the controller is configured to prevent the power system from moving the closure from an open position to a closed position when detecting that the step is not stowed.

13. The vehicle of claim 9 wherein the position sensor is a Hall effect sensor that detects a position of the closure relative to the vehicle.

14. The vehicle of claim 9 wherein the controller is configured to prevent actuating the power system to drive the closure to fully open unless the vehicle is in Park.

15. The vehicle of claim 14 wherein the controller is configured to prevent the power system from moving the closure from an open position to a closed position when detecting that the step is not stowed.

\* \* \* \* \*